March 2, 1965 P. K. SHARP 3,171,977
SIGNAL SUPPRESSION CIRCUIT HAVING MEANS FOR ELIMINATING PEDESTALS AND BASE LINE CHANGES
Filed Sept. 15, 1961
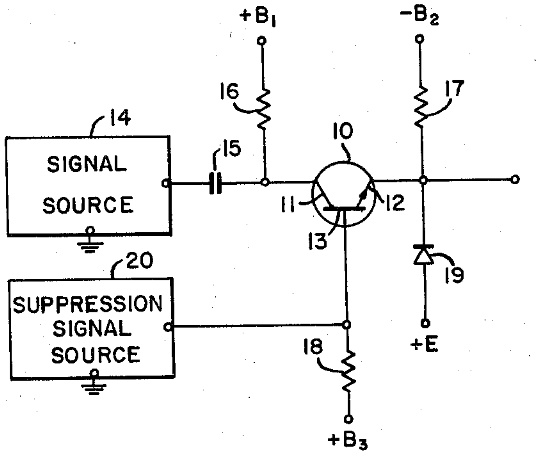

United States Patent Office 3,171,977
Patented Mar. 2, 1965

3,171,977

SIGNAL SUPPRESSION CIRCUIT HAVING MEANS FOR ELIMINATING PEDESTALS AND BASE LINE CHANGES

Paul K. Sharp, Beech Grove, Ind., assignor to Hazeltine Research Inc., a corporation of Illinois Filed Sept. 15, 1961, Ser. No. 138,340
2 Claims. (Cl. 307—88.5)

This invention relates to a signal suppression circuit. The invention has application in any electrical circuit where at times it is desirable to prevent the translation of a particular electrical signal from one point to another. For example, many receiving systems such as radar and television receivers are susceptible to the reception of undesirable noise signals. Conventional gate circuits which suffer from the shortcoming that the base line or average D.-C. level at the output of the gate changes when the gate is switched from open circuit to closed circuit or vice versa, cannot be used to prevent the translation of noise signals if changes in the base line cannot be tolerated. The present invention is directed to a circuit designed to suppress signals at desirable times without placing a pedestal of any kind, either positive or negative, in the output.

In accordance with the present invention, a signal suppression circuit comprises a normally saturated transistor having a plurality of electrodes and means for supplying an electrical signal to a first electrode of the transistor for translation to a second electrode of the transistor. The invention additionally includes means for supplying a suppression signal, when desired, to a third electrode of the transistor for rendering the transistor nonconductive to prevent translation of the electrical signal between the first two electrodes. The invention finally includes means for biasing the second electrode when the transistor is nonconductive to the potential the second electrode is at when the transistor is in saturation.

For a better understanding of the present invention, together with other and further objects thereof, reference is had to the following description taken in connection with the accompanying drawings, and its scope will be pointed out in the appended claims.

Referring to the drawing there is shown a signal suppression circuit constructed in accordance with the present invention.

*Description and operation of the signal suppression circuit*

Referring to the drawing, the signal suppression circuit includes a normally saturated transistor 10 having a plurality of electrodes. More particularly, transistor 10 has a collector electrode 11, an emitter electrode 12 and a base electrode 13. A collector resistor 16 is connected between the collector electrode 11 and a source of positive potential $+B_1$. An emitter resistor 17 is connected between the emitter electrode 12 and a source of negative potential $-B_2$. A base resistor 18 is connected between the base electrode 13 and a source of positive potential $+B_3$. Transistor 10, shown as an NPN transistor, may be a PNP transistor with appropriate polarity reversals of the sources of potential $B_1$, $B_2$ and $B_3$.

The signal suppression circuit additionally includes means for supplying an electrical signal to a first electrode of transistor 10 for translation to a second electrode. This means may include any source of an electrical signal shown symbolically by a signal source 14 along with a coupling capacitor 15. More specifically, the signal source 14 may be a video amplifier in a television receiver which supplies a video signal undesirably accompanied by noise signals. The video signal includes video information and synchronizing signals. The video signal along with the noise signals is supplied to the collector electrode 11 for translation of the video signal to the emitter electrode 12. A synchronizing signal separator may be connected to the emitter electrode 12.

The signal suppression circuit further includes means for supplying a suppression signal, when desired, to a third electrode of transistor 10 for rendering the transistor 10 nonconductive to prevent translation of the input electrical signal from the collector electrode 11 to the emitter electrode 12. This means is shown symbolically by the suppression signal source 20 which may be made to automatically supply a suppression signal to the base electrode 13 whenever noise signals are supplied to the collector electrode 11 and thereby prevent translation of the noise signal to the emitter electrode 12.

The signal suppression circuit finally includes means for biasing the emitter electrode 12 when the transistor 10 is nonconductive to the potential the emitter electrode 12 is at when the transistor 10 is in saturation. This means includes a source of positive potential +E and a diode 19 having its cathode connected to the emitter electrode 12 and its anode connected to the source of positive potential +E. The value of the source of positive potential +E is made substantially equal to the potential of the emitter electrode 12 when the transistor 10 is in saturation.

Transistor 10 is normally in saturation by virtue of the sources of potential $+B_1$, $-B_2$ and $+B_3$ and resistors 16, 17 and 18. Whenever positive pulses are supplied by the signal source 14 to the collector electrode 11, the potentials of the emitter electrode 12 and the base electrode 13 rise with the collector electrode potential since the transistor 10 is still in saturation. Thus, during saturation any positive signal supplied to the collector electrode 11 is translated to emitter electrode 12. Whenever it is desired to suppress a signal supplied by the signal source 14, a negative suppression signal is supplied by the suppression signal source 20 to the base electrode 13. This suppression signal renders the transistor 10 nonconductive and thereby prevents the signal supplied to the collector electrode 11 from being translated to the emitter electrode 12. Diode 19, with its anode biased to approximately the emitter electrode potential when the transistor is in saturation, is used to prevent the emitter electrode potential from changing, in particular, from going negative when suppression signals are supplied to the base electrode 13. Without the diode 19 and the source of positive potential +E, the emitter electrode potential would tend to go negative whenever transistor 10 is rendered nonconductive. Diode 19 and the source of positive potential +E prevent the development of any pedestal or change in the base line of the output voltage developed at the emitter electrode 12.

While there has been described what is at present considered to be the preferred embodiment of this invention it will be obvious to those skilled in the art that various changes and modifications may be made therein without departing from the invention and it is, therefore, aimed to cover all such changes and modifications as fall within the true spirit and scope of the invention.

What is claimed is:

1. A signal suppression circuit comprising: a normally saturated transistor having a plurality of electrodes; means for supplying an electrical signal to a first of said electrodes for translation to a second of said electrodes; means for supplying a suppression signal, when desired, to a third of said electrodes for rendering said transistor nonconductive to prevent said translation of said electrical signal between said first two electrodes; and means for biasing said second electrode when said transistor is nonconductive to the potential said second electrode is at when said transistor is in saturation.

2. A signal suppression circuit comprising: a normally saturated transistor having a collector electrode, an emitter electrode, and a base electrode; means for supplying an electrical signal to said collector electrode for translation to said emitter electrode; means for supplying a suppression signal, when desired to said base electrode for rendering said transistor nonconductive to prevent said translation of said electrical signal between said collector electrode and said emitter electrode; and means for biasing said emitter electrode when said transistor is nonconductive to the potential said emitter electrode is at when said transistor is in saturation.

References Cited in the file of this patent

UNITED STATES PATENTS

| | | |
|---|---|---|
| 2,906,891 | Scanlon | Sept. 29, 1959 |
| 2,941,091 | Schneider | June 14, 1960 |
| 3,008,057 | Campbell | Nov. 7, 1961 |

OTHER REFERENCES

Millman and Taub: Pulse and Digital Circuits, McGraw-Hill, New York, 1956, pages 430 and 431.

Hurley: "Junction Transistor Electronics" John Wiley and Son Inc., 1958, New York, pages 408 and 409.